May 29, 1934. E. H. EHLERS 1,961,038
INTERCHANGEABLE ARTIFICIAL TEETH AND ASSOCIATED PARTS
Filed March 21, 1931
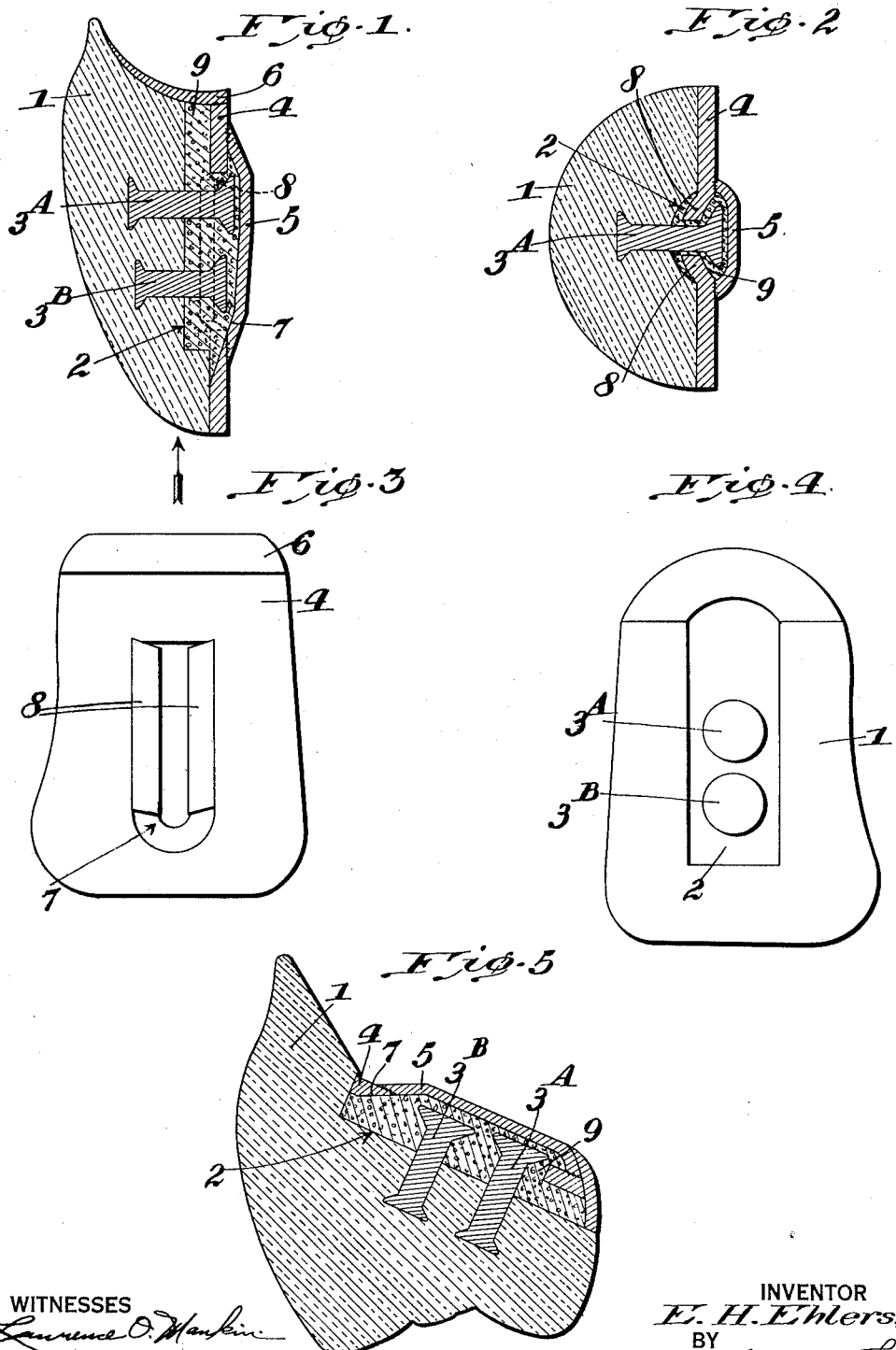

Patented May 29, 1934

1,961,038

UNITED STATES PATENT OFFICE 1,961,038

INTERCHANGEABLE ARTIFICIAL TEETH AND ASSOCIATED PARTS

Enrique Holtmann Ehlers, Madrid, Spain

Application March 21, 1931, Serial No. 524,358
In Spain December 15, 1930

4 Claims. (Cl. 32—9)

This invention relates to improvements in artificial interchangeable pin teeth and associated plate.

One of the objects of the invention is to provide an artificial interchangeable pin tooth which can be readily replaced when broken.

A further object of the invention is to provide an artificial interchangeable pin tooth and associated metal plate which is simple in construction and can be easily joined and fixed to the metal plate without the necessity of soldering yet insure a strong anchoring of the tooth.

The invention also includes improvements in the details of construction and arrangements of parts which will be hereinafter referred to and particularly pointed out in the claims.

In the accompanying drawing:

Figure 1 is a vertical section of my improved tooth and associated plate.

Figure 2 is a horizontal section of Fig. 1, the section being taken at the level of pin 3A.

Figure 3 is a detail view of the supporting plate looking from the front.

Figure 4 is a detail view of the artificial pin tooth looking from the rear.

Figure 5 is a vertical section of my improved molar tooth and associated plate.

The same reference characters refer to like parts in all the figures.

In the drawing, 1 denotes the porcelain of the tooth, said porcelain being formed with a groove 2 which is disposed in a central vertical plane in the rear of the tooth and which has a closing face at its bottom end. The double-headed pins are denoted by 3A and 3B, while the metal plate is denoted by 4. A small plate 5, which is soldered to the rear side of the plate 4, covers the pins 3A—3B. Another small plate 6, also soldered to the plate 4, serves to close the opening of the groove 2 at the base of the tooth. The three parts 4, 5 and 6 constitute the plate as a whole. The numeral 7 in Figs. 1, 3 and 5 denotes a bevel formed in the plate to facilitate fitting of the tooth to the plate, such fitting entailing a sliding movement of the tooth in the direction of the arrow in Fig. 1, and also to facilitate removal of the tooth from the plate.

The plate 4 has a portion 8 forming a convexity at the front of the plate and a concavity at the back, said concavity affording a receptacle for the head of each pin. The portion 8 has a longitudinal slot through which both pins pass. From Figs. 2 and 3 it will be clear that the portion 8 has the appearance of two small wings, which hold the heads of the pins and also the tooth.

As shown in Figs. 1, 2 and 4, in teeth other than molars, the groove 2 extends in the direction of the longitudinal axis of the tooth. As shown in Fig. 5, in molar teeth the groove 2 extends at a steep inclination to the axis of the tooth.

Once the main work of applying the tooth to the plate is completed, cement 9 is used to join them together. The cement also closes the space between the tooth and the plate and fills the space around the pins.

It will thus be seen that, by my invention, I have provided an artificial tooth which will have all the advantages of interchangeable teeth and which will also be as strongly mounted as unremovable teeth. Further, teeth made according to this invention can be used either with gold or rubber prothesis. Further, since the plate structure is the same for front and molar teeth, the same make of plate can be used for both kinds of teeth, which is not possible with interchangeable teeth as used heretofore. It will thus be apparent that the manner of making teeth according to this invention constitutes a substantial simplification and advance with respect to existing structures.

In the construction illustrated, two double-headed pins 3A and 3B of different lengths are shown arranged one above the other and when associated with the plate, the heads of the pins will be positioned at varying distances within the cement confined within the concavity of the portion 8. By such construction, the tooth will be amply supported throughout its major portion.

I claim:

1. An artificial pin tooth having a groove in the back thereof, a pin embedded in the tooth and projecting from the groove, the projecting end of the pin having a head, a supporting plate engaging the back of the tooth, said plate having an upset portion extending into the groove and having an entrance for the pin head, and a filler in the groove around the projecting pin and head and around the upset portion.

2. An artificial pin tooth having a groove in the back thereof, a pin embedded in the tooth and projecting from the groove, the projecting end of the pin having a head, a supporting plate engaging the back of the tooth, said plate having an upset portion extending into the groove and having an entrance for the pin head, a filler in the groove around the projecting pin and head and around the upset portion, and a covering member attached to said plate, confining the filler and concealing both the upset portion and said head.

3. An artificial pin tooth having a groove in the back thereof, a headed pin embedded in the tooth and having its headed portion projecting from the groove, a supporting plate in contact with the back of the tooth, said plate having an upset portion extending into the groove, said upset portion having an entrance for the head of the pin and a slot for the pin, a filler, and covering means secured to the supporting plate, completely concealing the filler and keeping it firmly impounded in the groove around the pin and head and around said upset portion.

4. An interchangeable tooth having two headed pins of which one is longer than the other, and means for lodging the pins in the tooth, said tooth having a narrow groove in the rear thereof, a metal plate having a slot and two small inclined wings, said wings extending into said groove, a small plate attached to the metal plate over the slot therein and having a bevelled section, said slot and the space between the plate and the inclined wings defining a T-shaped slot in cross section, said bevelled section allowing the passing of the pin heads into the T-shaped slot.

ENRIQUE HOLTMANN EHLERS.